United States Patent
Verhoeven

[15] 3,683,985
[45] Aug. 15, 1972

[54] SLICING MACHINE
[72] Inventor: Albert F. Verhoeven, Grand Rapids, Mich.
[73] Assignee: Werner Lehara Inc., Grand Rapids, Mich.
[22] Filed: March 1, 1971
[21] Appl. No.: 119,716

[52] U.S. Cl. .................. 146/62, 146/151, 146/131, 83/352
[51] Int. Cl. ....................... B26d 4/42, B26d 5/22
[58] Field of Search........146/131, 138, 137, 151, 62; 83/352, 354, 355, 356, 373

[56] References Cited

UNITED STATES PATENTS

| | | |
|---|---|---|
| 1,292,160 | 1/1919 | Unruh ..................... 145/151 |
| 2,006,643 | 7/1935 | Leo ......................... 146/151 X |
| 2,470,078 | 5/1949 | Hoenselaar .............. 146/151 |
| 3,411,460 | 11/1968 | Weil ....................... 146/151 X |

FOREIGN PATENTS OR APPLICATIONS 462,821  7/1928  Germany..................146/151

*Primary Examiner*—Willie G. Abercrombie
*Attorney*—Price, Heneveld, Huizenga & Cooper

[57] ABSTRACT

Apparatus for automatically slicing and depositing food products, such as pepperoni, cheese, and the like, in a predetermined pattern onto a pizza or other product which is moving on a conveyor beneath the apparatus. A cutter mechanism is mounted on a carriage for reciprocal movement, and a magazine carrying the product to be sliced is mounted for reciprocal movement on a second carriage. The carriages are mechanically interconnected such that movement of one will effect a corresponding movement in the opposite direction of the other. The cutter mechanism carries a knife edge which is oscillated in a direction transverse to the movement of the carriages. As the carriages move alternately toward and away from each other, the pepperoni is cut as the carriages move toward each other and is deposited on the pizza.

17 Claims, 9 Drawing Figures

PATENTED AUG 15 1972 3,683,985

INVENTOR
ALBERT F. VERHOEVEN

BY Price, Heneveld, Huizenga & Cooper

ATTORNEYS

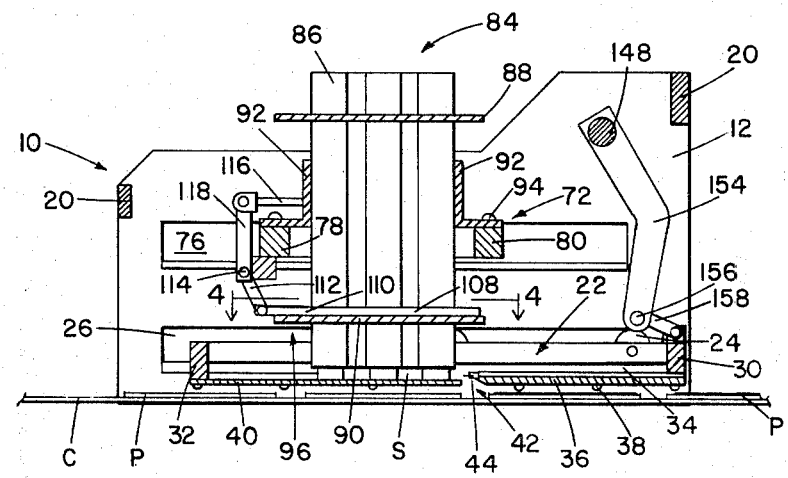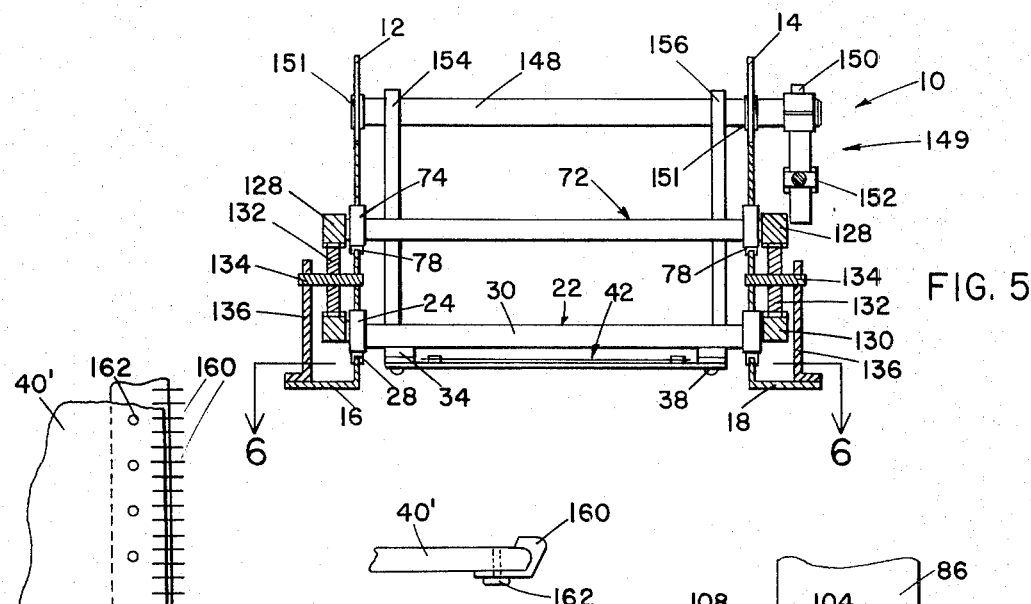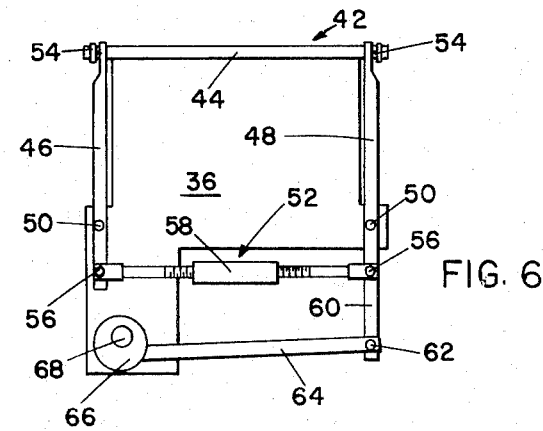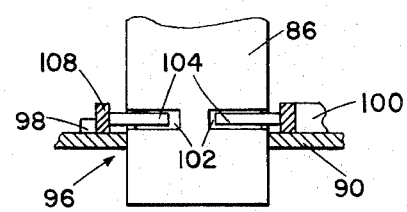

SLICING MACHINE

BACKGROUND OF THE INVENTION

In the automated preparation of food products, such as a frozen pizza, a final layer of thinly sliced pepperoni, sausage, or like food product is often provided. This final layer is usually arranged in a predetermined pattern on the top of the pizza before it is wrapped and frozen. In the past, in the construction of the final layer, the previously sliced products were individually placed by hand in a somewhat uniform pattern on the top surface as it was travelling on a conveyor. Obviously, this type of distribution does not lend itself to high-speed, high-volume production of comestible products. Further, increased emphasis has also been placed on sanitation and cleanliness in food processing facilities. Consequently, it is advantageous to resort to automated processing equipment to increase production and to eliminate manual handling of food products wherever possible.

SUMMARY OF THE INVENTION

Briefly, the invention comprises a pair of carriages mounted within a framework for reciprocal movement. One of the pair of carriages carries an oscillating cutter blade while the other carriage carries a magazine adapted to hold the food products which are to be sliced. The two carriages are interconnected through gear mechanisms such that movement of one carriage effects a corresponding movement in the opposite direction in the other. As the two carriages move together, a food product to be sliced is passed through the cutter blade, and the individual slices drop below onto products carried on a conveyor below. The magazine is mounted on the carriage for easy removal and can be replaced by magazines which are designed to hold other sizes and shapes of products. A loaf type of meat product could be carried for the automatic production of sliced meat sandwiches. Cheese, cookies, and cakes could be similarly automatically sliced and deposited.

A portion of the cutter assembly is adjustable with respect to the magazine and the cutter so that the thickness of the slices may be varied. The stroke of the carriages toward and away from each other may be adjusted to compensate for varying length products on which the slices are deposited.

Means are also provided to hold meat products against the side walls in the magazine during the cutting stroke to prevent movement of the product resulting in uneven slices. At the completion of the cutting cycle, the product is released and drops against the adjustable portion of the cutter to begin a new cutting cycle.

It is, therefore, a primary object of my invention to provide an automatic slicing machine for food products.

It is also an object of my invention to provide a slicing machine which will automatically slice and deposit the slices onto a food product which is passing below the slicer.

Another object of my invention is to provide a slicing machine which, because of its mechanical arrangement of food carrier and slicer, is extremely rapid in its operation and which utilizes minimum space.

It is a further object of my invention to provide a cutter element which oscillates in a direction transverse to the movement of the cutter assembly.

Still a further significant object of this invention provides a cutter carriage and a magazine carriage, each of which are mounted for reciprocal movement in opposition to each other.

It is yet another object of this invention to provide a mechanical interconnection between the magazine carriage and the cutter carriage, such that the movement of one effects movement of the other.

These and other objects of this invention will be readily understood by reference to the following specification and accompanying drawings, wherein:

FIG. 3 is a cross-sectional view taken along plane 3—3 of FIG. 1;

FIG. 5 is a cross-sectional view taken along plane 5—5 of FIG. 2;

FIG. 6 is a cross-sectional view taken along plane 6—6 of FIG. 5;

FIG. 7 is a cross-sectional view taken along plane 7—7 of FIG. 4;

FIG. 8 is a view of a modified, adjustable plate of my invention adapted for shredding a product; and, FIG. 9 is a side view of the modification shown in FIG. 8.

DESCRIPTION OF THE PREFERRED EMBODIMENT

Figure 1:
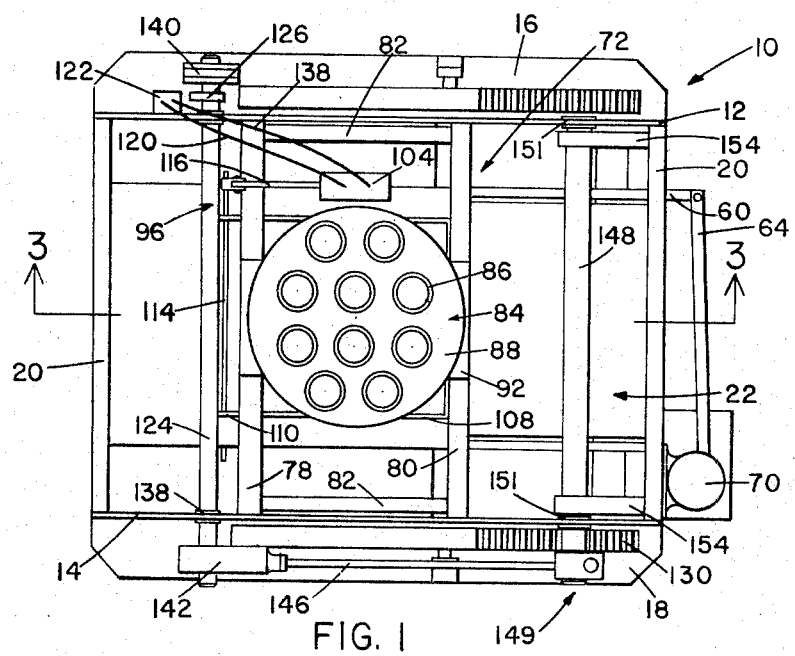
FIG. 1 is a top plan view of my invention.

Referring now to the drawings, the preferred embodiment will be described in detail.

Figure 2:
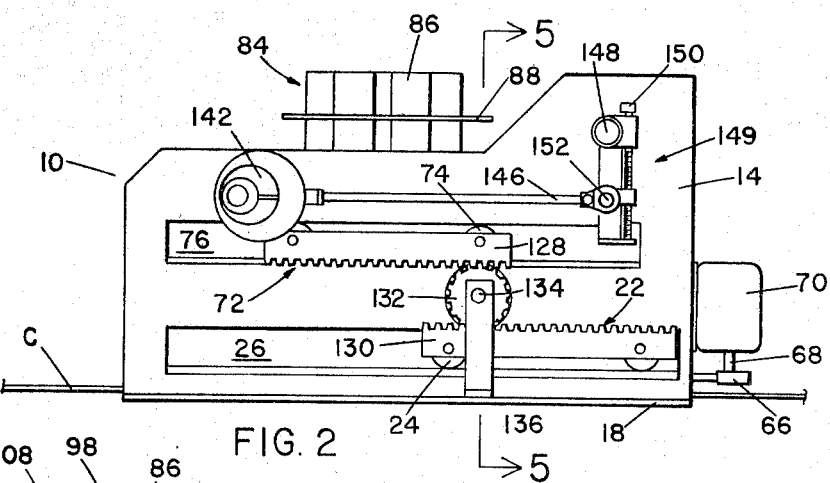
FIG. 2 is a side-elevational view thereof.

FIGS. 1 and 2 show a framework indicated generally by the numeral 10. The framework has sidewalls 12 and 14, each having lower flange portions 16 and 18, respectively. The sidewalls are held in a spaced apart relationship by cross-braces 20 which are welded in place and form a solid frame construction.

The cutter carriage assembly is indicated generally by the numeral 22 and is mounted for horizontal movement along the length of the framework 10 on rollers 24. The rollers 24 ride in elongated slots 26 provided in the sidewalls 12 and 14. As shown in FIG. 5, rails 28 line the elongated slots 26 and provide a wear resistant surface on which the rollers 24 may ride.

As illustrated in FIGS. 3 and 5, the cutter carriage assembly 22 comprises a pair of support braces 30 and 32 extending across and towards the sides of the framework 10 and fixed such that they are horizontally and movably supported by the rollers 24. A pair of transversely extending rails 34 are fixed to the support rails and form the framework of the carriage assembly 22. A cutter support plate 36 is fixed at its sides to the transverse rails 34 by screws 38 or other suitable fastening means. An adjustable plate 40 is mounted in the same plane as the cutter support plate 36 and is attached to the transverse rails 34 with screws 38. The adjustable plate may be adjusted vertically by removing the screws 38 and placing or removing shims (not shown) between the plate 40 and the rails 34.

The oscillating cutting edge of knife assembly 42 mounted on the plate 36 is shown in greater detail in FIG. 6. A knife edge 44 forms one end of a rectangular arrangement of pivotally mounted components. The side legs 46 and 48 of the rectangular structure are pivotally mounted on the plate 36 on pivot pins 50. An adjustable tensioner member 52 forms the end of the rectangle opposite the knife edge 44. The knife edge 44 is loosely held at its ends by a pair of clamps 54 so as to provide pivotal movement of knife blade 44 on the ends of the legs 46 and 48. Alternately, knife edge 44 may have holes provided at its ends and be mounted on corresponding raised pins on the side legs 46 and 48 so as to provide the same function. The tensioner 52 is pivotally connected at its ends to side legs 46 and 48 on pivot pins 56. Proper tension is maintained on the knife edge 44 by turning the threaded link 58 of the tensioner 52 against its threaded ends which pivot on the legs 46 and 48. The leg 48 has an extended arm 60 connected through a pivot pin 62 to an arm 64 which is in turn connected to eccentric drive mechanism 66. The eccentric drive 66 driven by a shaft 68 connected to drive motor 70 (FIGS. 1 and 2) imparts a movement to arm 64 which is transmitted to knife 44 as the sides 46 and 48 reciprocally pivot on pivot pins 50. The drive motor 70, the oscillating knife assembly 42, and the plate 36 are all mounted on and travel with the cutter carriage 22.

An upper carriage assembly generally designated by the numeral 72 is mounted for horizontal movement along the length of the framework 10 on rollers 74 which ride in elongated slots 76 provided in the sidewalls 12 and 14 above the elongated slots 26. As illustrated in FIG. 5, rails 78 line the elongated slots 76 and provide a bearing surface for the rollers 74. As illustrated in FIGS. 3 and 5, the upper carriage assembly 72 is mounted above and travels in a horizontal and parallel plane to carriage 22. The upper carriage comprises a pair of support braces 78 and 80 extending across and toward the sides of framework 10 and fixed such that they are horizontally supported by the bearings 74. A pair of transversely extending rails 82 are fixed to the support rails 78 and 80 and form the framework of the carriage assembly 72.

A magazine assembly 84 is mounted on the carriage 72 and is adapted to carry sausage, pepperoni, or other food product which is to be sliced and deposited on the pizza or other comestible product.

In the illustrated embodiment, the magazine assembly 84 comprises a plurality of tubes 86 arranged in a predetermined pattern which corresponds to the pattern to be deposited on the product. The tubes 86 are held in this pattern by upper and lower support members 88 and 90. The tubes pass through these support members and are welded in place forming a solid array of tubes 86. A pair of mounting brackets 92, fixed on opposite sides of the assembly, are used to mount the magazine assembly 84 on the support braces 78 and 80. The magazine assembly 84 is mounted for removal by a fastening means 94 and may be removed and replaced by any of a wide variety of shapes, designs, and patterns, depending upon the product to be sliced and the shape of the article upon which the product is to be deposited.

When the magazine 84 is utilized for holding tubular type meat products, which are considerably smaller in diameter than the inner diameter of the tubes 86, it is usually desirable to provide an additional holding means to prevent the movement of the product within the tubes. A holding means for this purpose is illustrated in FIGS. 1, 3, 4, and 7 and is designated by the numeral 96.

Figure 4:
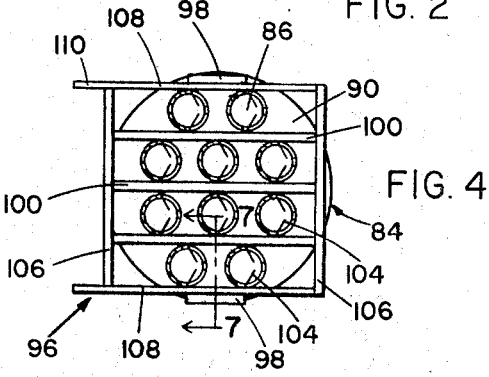
FIG. 4 is a cross-sectional view taken along plane 4—4 of FIG. 3.

Referring specifically to FIG. 4, the holding means 96 is shown surrounding the array of tubes 86 and is mounted for movement on the lower tube support member 90. Guides 98 fixed on the support member 90 prevent lateral movement of the holder 96 by holding against its outer sides 108. A plurality of cross-members 100 extend across the holder, pass between the individual rows of tubes 86, and are fixed to sides 106 and 108 of the holder. Each tube 86 in the magazine is provided with elongated slots 102 (FIG. 7) located slightly above the lower tube support member 90. The slots 102 are arranged to be in substantial alignment with flexible fingers 104 which are carried by the cross-members 100 and extend into the tubes 86 through the slots 102. The fingers 104 are made from a resilient spring material and are to be fixed to the cross-members in any convenient fashion. As the framework is moved to the left as viewed in FIG. 4, the fingers 104 pass through the elongated slots in the tubes and bear against the product which is to be sliced holding the product against the inner walls of the tubes 86.

The holder means 96 is actuated by an air cylinder 104 having a piston rod 116 which is connected to a rocker arm 118. Rocker arm 118 is fixed to a rocker shaft 114 to which is also fixed a lever 112 connected to extension 110 of the frame sides 108. Actuation of the air cylinder is controlled through a pair of air lines 120 which are connected to a cam actuated control valve 122. The control valve 122 is connected to a suitable source of pressurized air (not shown) and is mounted adjacent to a drive shaft 124. A cam 126 mounted on the drive shaft selectively controls the extension or retraction of the piston rod 116 of the air cylinder 104 in response to rotation of the drive shaft 124.

Turning again to FIGS. 2 and 5, gear racks 128 are shown connected to each side of the upper carriage assembly 72 and located outside the framework 10. Similar gear racks 130 are connected to the sides of the lower cutter carriage assembly 22. Pinion gears 132 rotatably supported on shafts 134 provide a mechanical interconnection between the gear racks 128 and 130. The gear shafts 134 are supported at one end in brackets 136 fixed to the flanges 16 and 18 and at their opposite ends in the sidewalls 12 and 14 of the framework. As a result of the mechanical interconnection of the gear racks 128 and 130 through pinion gears 132, movement of carriage 22 will cause rotation of the pinion gear and a corresponding movement in the opposite direction of carriage 72. As a result, magazine assembly 84 will pass over the cutter assembly 42 at the same time as the cutter assembly 42, which is moving in the opposite direction, is passing under the magazine assembly 84.

The drive shaft 124, driven by a suitable power source (not shown) through a drive pulley 140 connected at one end of the shaft, passes through both sides of the framework 10 and is mounted for rotation in journal bearings 138. An eccentric drive mechanism 142 is mounted on the opposite end of the shaft 124 and serves to impart a reciprocating motion to a connecting arm 146. The reciprocating motion of connecting arm 146 is imparted to the carriages 22 and 72 through a pair of rocker arms 154 secured to a rocker shaft 148, journaled in rearings 151 through adjustable rocker arm assembly 149. Thus, as the drive shaft 124 is rotated, eccentric drive mechanism 142 imparts a rocking action to rocker shaft 148 through the connecting arm 146 and the adjustable arm 149. As the rocker shaft 148 is rotated, arms 154 transmit the rocking motion to the lower cutter carriage assembly 22 through a link 158 moving the carriage from one end of the framework 10 to the other. As the drive shaft 124 continues rotating, the action of the eccentric mechanism 142 causes rocker shaft 148 to rotate in the opposite direction thereby moving the carriage back to its original position. Accordingly, as described above, the mechanical interconnection between the lower and upper carriage assemblies 22 and 72 through the rack and pinion gears cause a corresponding and opposite movement of the upper carriage assembly 72 in response to movement of the lower carriage assembly 22.

The rocker arm assembly 149 is adjustable in a conventional fashion by means of a knob and screw arrangement 150 which varies the distance between the pivotal connection 152 on the connecting arm 146 and the rocker shaft 148. Downward movement of the connection 152 provides increased travel of the rocker arm 149 and carriages 22 and 72 while upward movement decreases the travel thereof. The rocker arms 154 (FIG. 3) are fixed to the rocker shaft 148 inside the framework and are connected at their opposite ends through pivot links 158 to the lower cutter carriage assembly 22.

OPERATION

In operation, the apparatus is mounted over a conveyor belt C having equally spaced thereon a plurality of the product P on which the slices are to be deposited. The product moves on the conveyor from the left toward the right as viewed in the figures.

Pepperoni, sausage, or other products to be sliced are placed in the tubes 86 of the magazine 84, and the thickness of the slices is adjusted by raising or lowering the adjustable plate 40 with respect to the cutting edge 44. As shown there is a gap provided between the bottom of the magazine 84 and the adjustable plate 40 for the purpose. The pepperoni S moves and slides with the magazine 84 on the adjustable plate 40.

As the conveyor moves forward, when the product P is located directly below the magazine 84, the drive shaft 124 is rotating, and through the above-described eccentric drive mechanism and connecting linkages, the upper and lower carriages 22 and 72 are moving toward each other. As the pepperoni S carried in the magazine 84 and sliding on plate 40 contacts the knife edge 44, the pepperoni is sliced and drops between cutter mounting plate 38 and adjustable plate 40 onto the product P. The upper carriage assembly magazine 84 is traveling in the same direction and at the same rate as the product on the conveyor. The cutter assembly 22 is closing toward the magazine 84 at the same rate, thereby resulting in a complete cutting and depositing cycle while the product is passing through a distance equal to one-half of its length. As the rotation of the drive shaft 124 continues, the carriages are returned to the first position to begin a second cutting and depositing cycle.

Concurrently with the forward travel of the magazine 84, the air cylinder 104 has been actuated through the action of cam 126 and air valve 122 to move holding apparatus 96 into a position to hold the pepperoni S against the sidewalls of the tubes. At the completion of the cutting stroke, as the carriages 22 and 72 are returning to a first position, air cylinder 104 is activated in the opposite direction by the action of cam 126 and air valve 122. The fingers 104 move away from the pepperoni allowing it, as the magazine 84 and the cutter assembly 42 move away from each other, to drop down onto the adjustable plate where it is positioned for a new cutting stroke.

Obviously, many different magazine constructions could be utilized depending on the size and shape of the product to be deposited. One modification which is commonly utilized provides for the distribution of shredded cheese on a pizza.

FIGS. 8 and 9 show a modified adjustable plate 40′ adapted for mounting adjacent to the knife edge 44 in place of the adjustable plate 40 shown in FIG. 1. The modified plate 40′ is provided with a series of upstanding knife edges 160 placed along the edge adjacent the oscillating knife edge 44. The knife edges 160 may be machined from a single piece of a suitable material and affixed to the plate 40′ by screws 162 or other suitable fastening means. In use, these knife edges 160 serve to slit the cheese in a first direction perpendicular to the adjustable plate while it is moving toward the knife edge 44. The oscillating knife edge 44 may be provided with a serrate edge and cuts the cheese in transverse direction resulting in finely shredded pieces of cheese. The oscillating action of the knife edge 44 also serves to distribute the cheese in a uniform pattern over the surface of the pizza. When the apparatus is used for shredding cheese, it is generally not necessary to utilize the holding means 96, and it may, therefore, be disconnected.

It will, therefore, be seen that my invention has provided a slicing apparatus which is relatively simple in construction, is fully automatic in its operation, and which, because of its unique arrangement of reciprocating cutter and magazine carriages which move toward each other, will provide a saving in spatial requirements.

While the preferred embodiment of this invention has been illustrated in detail, it will be apparent to those skilled in the art that many modifications thereof may be made without departing from the concepts disclosed herein. Such modifications are to be considered as included in the following claims, unless these claims by their language expressly state otherwise.

The embodiments of the invention in which an exclusive property or privilege is claimed are defined as follows:

1. An apparatus for automatically cutting products into individual slices comprising: cutting means mounted for reciprocating movement; means for holding said product mounted for reciprocating movement adjacent said cutting means; means for reciprocating one of said cutting means and said holding means; and means operably connecting said cutting means and said holding means whereby reciprocating movement of one of said cutting means and holding means will effect a corresponding reciprocating movement in the opposite direction in the other of said means.

2. An apparatus as claimed in claim 1 wherein said cutting means comprises a carriage supported for horizontal reciprocating movement; a knife edge mounted on said carriage for oscillating transverse movement with respect to the movement of said carriage and means for imparting oscillating motion to said knife edge.

3. An apparatus as claimed in claim 2 further comprising means on said carriage adjacent said cutting edge for varying the thickness of the individual slices.

4. An apparatus as claimed in claim 1 wherein said cutting means comprises: a carriage supported for reciprocating horizontal movement; a first plate fixed to said carriage having a knife edge mounted thereon transverse to the movement of said carriage; a second plate fixed to said carriage adjustable with respect to said first plate and said knife edge whereby the thickness of the individual slices may be varied.

5. An apparatus as claimed in claim 4 further comprising a plurality of upstanding knife edges mounted on said second plate adjacent said knife edge to cut said product in a direction perpendicular and transverse to said knife edge.

6. The apparatus as claimed in claim 4 wherein said second plate is removably mounted on said carriage.

7. An apparatus as claimed in claim 1 wherein said holding means comprises a carriage supported for horizontal reciprocating movement; a magazine fixed in said carriage for movement therewith; and means in said magazine for holding said products in a predetermined pattern.

8. The apparatus as claimed in claim 7 wherein said holding means further comprises an auxiliary holding means in said magazine to hold said products during a forward movement of said carriage and releasing said product during the reverse movement of said carriage.

9. The apparatus as claimed in claim 8 wherein said auxiliary holding means comprises: a slidably mounted framework; flexible product engaging fingers on said framework, said framework and said fingers movable between a product holding position and a released position in response to movement of said carriage.

10. The apparatus as claimed in claim 7 wherein said magazine is removably mounted on said carriage.

11. The apparatus as claimed in claim 1 in which said cutting means comprises a bed on which the product is placed and moved and a blade mounted above the surface of said bed and movable with said bed in a direction opposite to the direction of movement of said product.

12. An apparatus as claimed in claim 1 wherein said connecting means comprises gear racks mounted on said cutting means and said holding means and a rotatably mounted pinion gear engaging said racks.

13. Apparatus for cutting products into individual slices comprising: a supporting framework; first and second carriages mounted for horizontal movement, one above the other, in said supporting framework; a knife edge mounted on said first carriage and movable therewith; a holder for said products mounted on said second carriage for movement therewith, said comestible product passing through said holder and contacting said first carriage; rack and pinion gear means operably connected to said first and second carriages and said framework; reciprocating drive means connected to said gear means whereby in response to said reciprocating drive means said first and second carriages are caused to move alternately toward and away from each other.

14. The apparatus for cutting as claimed in claim 13 and further including: adjustable means connected to said reciprocating drive means for varying the length of travel of said first and second carriages alternately toward and away from each other, thereby providing a variable cutting stroke.

15. An apparatus as claimed in claim 13 wherein said knife edge, mounted on said first carriage comprises: a pair of legs pivotally mounted on said carriage in a spaced apart relation, said legs forming the opposite sides of a rectangle, one of said legs having an extended arm portion; said knife pivotally mounted on said leg and forming one end of said rectangle; attentioner pivotally mounted on said legs and forming the other end of said rectangle; and an eccentric drive mechanism connected to said arm to thereby impart an oscillating motion to said knife edge.

16. Apparatus as claimed in claim 13 wherein said rack gears are fixed to said carriages.

17. An apparatus as claimed in claim 16 wherein said pinion gear is fixed to said framework between said gear racks whereby movement of one of said gear racks will, through said pinion, effect a corresponding and opposite movement in the other of said gear racks.

* * * * *